United States Patent [19]
Lutz

[11] 3,726,517
[45] Apr. 10, 1973

[54] VEHICULAR SUSPENSION SYSTEM HAVING PNEUMATIC SPRINGS

[75] Inventor: Dieter Lutz, Schweinfurt am Main, Germany

[73] Assignee: Fichtel & Sachs AG, Schweinfurt am Main, Germany

[22] Filed: Mar. 29, 1971

[21] Appl. No.: 128,964

[30] Foreign Application Priority Data

Apr. 4, 1970 Germany..................P 20 16 192.6

[52] U.S. Cl. ................................................267/64 R
[51] Int. Cl. ...............................................F16f 5/00
[58] Field of Search ..........................267/64 R, 64 A

[56] References Cited

UNITED STATES PATENTS

| | | | |
|---|---|---|---|
| 2,982,538 | 5/1961 | De Carbon | 267/64 |
| 3,493,239 | 2/1970 | Allinquant | 267/64 |

*Primary Examiner*—James B. Marbert
*Attorney*—Kelman & Berman

[57] ABSTRACT

The pneumatic springs connecting two associated wheels to the chassis of a motor vehicle are connected by throttling tubes to a common source of air under pressure, the air pressure being controlled by a hydraulic system including a two-way valve set according to the relative position of chassis and wheels.

10 Claims, 4 Drawing Figures

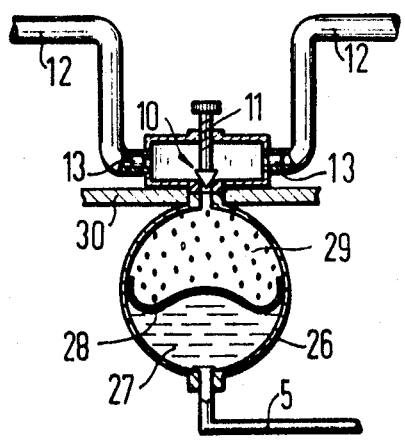
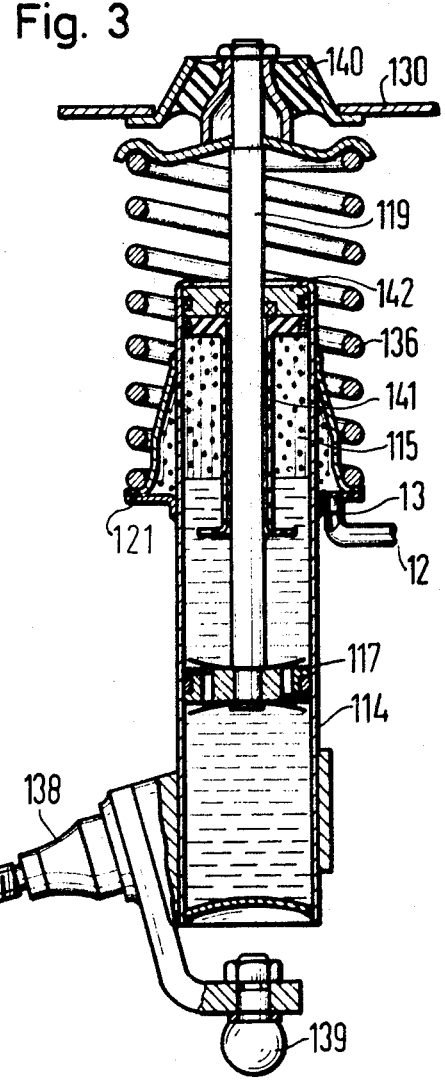

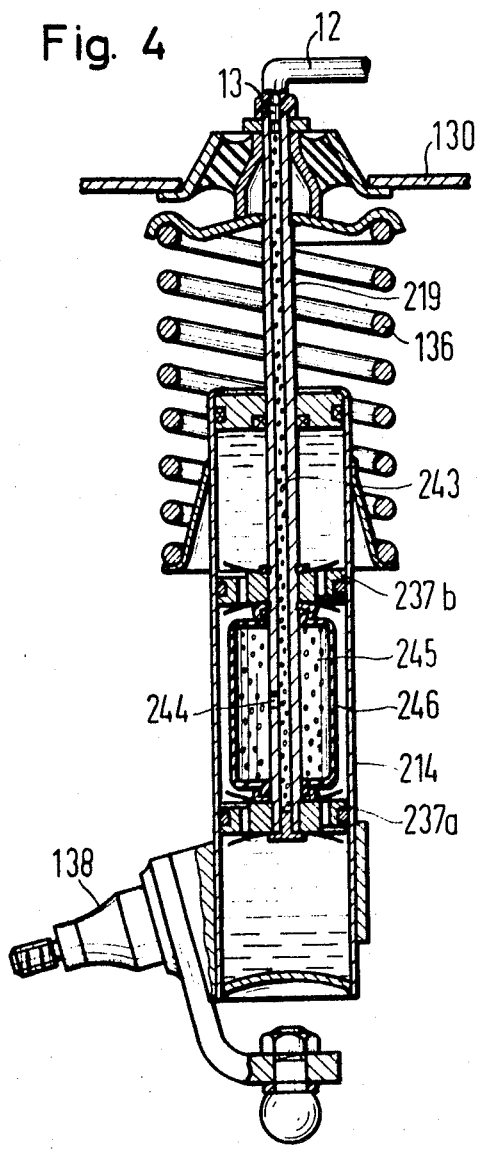

VEHICULAR SUSPENSION SYSTEM HAVING PNEUMATIC SPRINGS

This invention relates to suspension systems for automotive and like vehicles, and particularly to a suspension system having pneumatic springs.

It is known to vary the air pressure in such a spring in response to changes in the applied load and to the resulting relative movement of the piston and cylinder of the spring. A source of supplemental air under pressure is an integral part of the known pneumatic spring and increases the space required for installing the spring where such space may not readily be spared. Known suspension systems in which the source of supplemental air is a separate unit are complex and require controls which are costly to build and to maintain.

A primary object of this invention is the provision of a pneumatic vehicular suspension system which requires but a minimum of space, yet is simple and correspondingly rugged.

With this object and others in view, as will hereinafter become apparent, the invention, in its more specific aspects, provides a vehicular suspension system in which at least one pneumatic spring is provided with mountings for securing respective portions of the spring to the sprung and unsprung masses of a vehicle. A fluid-operated source of gas under pressure is spaced from the spring and connected with the same by an elongated conduit with permits flow of gas between the spring and the source and the resulting variations in the spring characteristics of the spring. A throttling device in the conduit impedes such flow. A control device is interposed between the gas source and a source of operating fluid and is operatively connected to the aforementioned portions of the spring to connect the sources and thereby increase the gas pressure in response to relative movement of the spring portions in one direction, and for disconnecting the sources and thereby decreasing the gas pressure in response to relative movement of the spring portions in the opposite direction.

Other features, additional objects, and many of the attendant advantages of this invention will readily be appreciated as the same becomes better understood by reference to the following detailed description of preferred embodiments when considered in connection with the appended drawing in which:

FIG. 2 shows a modified detail for the apparatus of FIG.1; and

FIGS. 3 and 4 show other pneumatic spring arrangements suitable for use in the suspension system of FIG.1, the views of FIGS. 2 to 4 corresponding to that of FIG.1.

Figure 1:
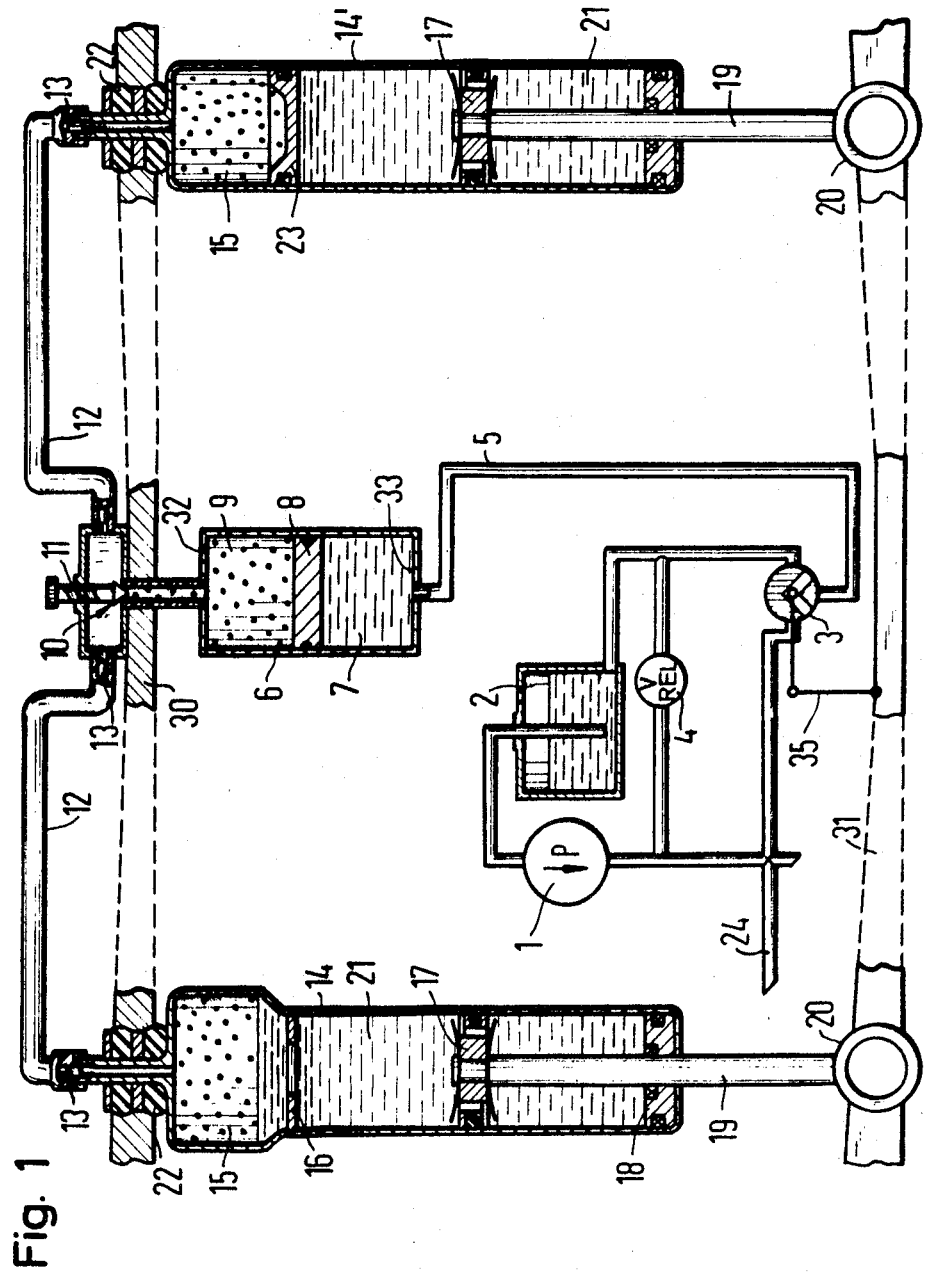
FIG. 1 shows a suspension system of the invention partly in fragmentary elevational section, and partly diagrammatically.

Referring now to the drawing in detail, and initially to FIG.1, there is shown as much of an otherwise conventional motor car as is needed for an understanding of this invention. Only parts of the chassis 30 and the rear axle 31 are illustrated. The ends of the axle 31 carry non-illustrated wheels and are connected to the chassis 30 by respective pneumatic springs whose upright cylinders 14,14' are secured to the chassis 30 by mounting attachments 22. The top end of each cylinder cavity holds a cushion 15 of compressed air or nitrogen while the lower part is filled with oil 21. A piston 17, apertured to provide axial throttling passages is axially movable in the oil 21 in each cylinder 14,14' and is attached to a piston rod 19 projecting downwardly from the cylinder in movable sealing engagement with an annular end wall 18. The free, outer ends of the piston rods 19 are fastened to respective ends of the axle 31 by fastening eyes 20.

The gas cushion 15 and the oil 21 in the cylinder 14 are in direct contact, and the interface is located in a radially enlarged portion of the cylinder 14 above a baffle ring 16 in all operating conditions of the left pneumatic spring in FIG.1. As the piston 17 moves axially downward in the cylinder 14, jets of oil are discharged in an upward direction from the throttling apertures of the piston and are broken up by the baffle ring 16 so as to prevent intensive mixing of the oil 21 and the gas of the cushion 15. Such an arrangement is satisfactory where the cylinder axis is vertical or close to a vertical position.

In the cylinder 14' of the right pneumatic spring, a floating disc or piston 23 separates the oil 21 from the gas cushion 15 in movable sealing engagement with the inner cylinder wall. The last-described arrangement is preferred where the spring axis is obliquely inclined relative to the vertical at a relatively great angle, and it may be installed in any position. While two slightly different springs have been shown in FIG.1 for the convenience of pictorial representation, it will be understood that the two springs will normally be identical and may be of either illustrated type.

Conduits 12 connect the gas cushions 15 to a common needle valve 10. The conduits are nylon tubes of capillary cross section (a few tenths of a millimeter) and of adequate wall thickness to withstand the operating pressure in the pneumatic cushions which may be of the order of 1500 p.s.i. or more. Each conduit 12 is equipped with two plugs 13 of sintered bronze further to increase the throttling effect of the capillary tubing. The dimensions of the tubing 12 and the plugs 13 transverse to the direction of flow have been greatly exaggerated in the drawing for the sake of clarity.

The needle valve 10 communicates with a cylindrical container 6 through an opening whose throttling effect may be controlled manually by turning the threaded valve needle 11, and which may be sealed by the needle 11. The interior of the container 6 is axially divided by a floating seal or wall 8 into a lower, oil-filled compartment 7 and a higher, gas-filled compartment 9. Axial movement of the wall 8 is limited by abutting engagement with the upper container wall 32 having an opening connected to the needle valve 10 and with the lower container wall 33 in which an opening communicates with a conduit 5. In the non-illustrated terminal positions, the disc 8 seals the respective openings of the end walls 32,33.

The conduit 5 connects the compartment 7 with a two-way valve 3 shown in its inoperative position in which it blocks the conduit 5. The casing of the valve 3 is fixedly mounted on the chassis 30 in a manner not specifically illustrated, and the valve is operated by a linkage 35 connected to the axle 31. In one of its operative positions, the valve 3 connects the conduit 5 to the discharge end of a pump 1, and in the other operative position to the oil sump 2 connected to the intake of the pump 1. A pressure relief valve 4 prevents excess pressure build-up in the hydraulic system. The pump 1 is driven by the non-illustrated engine of the motor car and also provides operating fluid for a power-steering system as is partly indicated by connecting lines 24.

When an increased load on the rear end of the vehicle causes the piston rods 19 to move inward of the cylinders 14,14' as the chassis 30 moves downward toward the axle 31, the valve 3 connects the pump 1 to the oil compartment 7 of the container 8, and gas is driven from the gas compartment 9 through the needle valve 10 into the cushions 15. The increased gas pressure causes the piston rods 19 to be expelled from the cylinders 14,14' until the valve 3 resumes a neutral or inoperative position. When the vehicle load on the pneumatic springs is reduced, and the gas cushions 15 expand, the increasing distance of the axle 31 from the chassis 30 causes the linkage 35 to shift the valve 3 into the position in which it vents the oil compartment 7 to the sump 2, the sump being open to the atmosphere. Gas can then flow from the cushions 15 into the gas compartment 9 to reduce the effective length of the two pneumatic springs.

The gas flow between the springs and the compartment 9 is sufficiently impeded by the throttling effect of the narrow conduits 12 and the plugs 13 to make the changes in the chassis level smooth and gradual. The throttling effect may be adjusted by means of the needle valve 10 without affecting the flow resistance through the conduits 12 from one gas cushion 15 to the other. Transient asymmetrical load changes such as those occurring while the car travels through a curve to cause a load reduction on one spring and a simultaneous increase in the load on the other spring do not cause significant gas flow because the two conduits 12 and their plugs 13 jointly provide much greater flow resistance than that of a single conduit combined with the throttling effect of the needle valve 10.

During assembly of the system, the container 6 and the needle valve 10 are connected first, and the compartment 9 is charged with an amount of gas sufficient for the assembled system. The valve 10 is closed, and the internal gas pressure drives the movable wall 8 into abutting engagement with the end wall 33, thereby sealing the opening in the latter and reliably preventing escape of the precisely dosed, compressed gas.

The pneumatic springs are provided with the necessary amounts of oil 21 which may be, and usually is different from the operating oil in the sump 2. The several bodies of oil are separated from each other in the assembled system by the movable wall 8 and other elements.

The conduits 5,12 may be installed last, and the cushions 15 brought up to operating pressure by opening the valve 10. Oil is pumped from the sump 2 into the compartment 7, thereby moving the wall 8 toward the illustrated position.

In the event of failure in the hydraulic system, the wall 8 seals the opening in the end wall 33 and sufficient pressure is maintained in the gas cushions 15 to permit at least emergency operation of the vehicle. Similarly, a leak in the pneumatic system does not severely affect the power steering system because the wall 8 abuts against the end wall 32 and seals its opening. No contaminants in the oil bodies 21 can reach the sensitive power steering mechanism.

In the illustrated neutral or inoperative position of the valve 3, the gas cushions 15 are sufficiently separated from each other by the narrow conduits 12 and the plugs 13 to provide the normal pneumatic spring response to changes in the dynamic loading of individual associated wheels.

Obviously, numerous structural details of the illustrated system may be varied, and the system is readily adapted to other wheel supports, such as those for independently sprung, steered front wheels. In the latter case, the linkage 35 may connect the valve 3 to a stabilizer bar or other element of the front suspension which moves with both front wheels.

Such variations and adaptations are illustrated, by way of example, in FIGS. 2 to 4. The source of supplemental gas under pressure shown in FIG. 2 has a cylindrical container 26 having diametrically opposite openings respectively communicating with the valve 10 and the conduit 5. The liquid compartment 27 in the container 26 is separated by a flexible diaphragm 28 from the gas compartment 29, the diaphragm sealing the two compartments from each other and being adequately movable to permit expansion and contraction of the compartments as described above with reference to the container 6.

FIG. 3 illustrates a suspension of the McPherson type for the steered front wheel of a motor vehicle. Its pneumatic spring has a cylinder 114 fixedly attached to a steering knuckle 138 which is provided with a ball joint 139 in the usual manner. The piston rod 119 extends from an apertured piston 117 through an annular upper end wall 142 of the cylinder 114 to a mounting assembly 140 which fastens the rod 119 to the vehicle chassis 130 while also providing an abutment for a helical compression spring 136 coaxial with the cylinder 114 and engaging a flange 121 on the cylinder. A gas cushion 115 in the upper cylinder portion communicates with the source of supplemental gas, not itself seen in FIG.3, through a conduit 12 equipped with a porous metal plug 13 through an opening in the flange 121. A flanged sleeve 141 extends from the end wall 142 about the piston rod 119 axially beyond the gas cushion 115, and its flange provides a baffle for breaking up jets of oil discharged from the piston 117 when it moves inward of the cylinder 114, as described above with reference to the baffle ring 16.

The front wheel suspension illustrated in FIG.4 has a cylinder 214 attached to a steering knuckle 138 and connected to the vehicle chassis 130 by a helical compression spring 136 and a piston rod 219 substantially as described with reference to FIG.3. The piston rod 219 carries two axially spaced pistons 237a,237b, and an annular bag 246 of resilient and pliable material in the space axially bounded by the two pistons and radially bounded by the opposite axial surfaces of the rod 219 and of the cylinder 214.

The conduit 12 is connected to the upper end of an axial bore 243 in the piston rod 219 which communicates with a gas compartment 245 sealed in the bag 246 through radial openings 244 in the piston rod 219. The remainder of the interior in the cylinder 214 is filled with oil, and the bag 246 is expanded and contracted to compensate for the volume of the piston rod 219 withdrawn from or introduced into the cylinder 214 during normal operation of the pneumatic spring.

The system illustrated in FIG.1 does not operate in a significantly different manner when partly modified as is shown in FIGS.2 to 4. The last-mentioned Figures do not exhaust the variations of the system described in more detail with reference to FIG.1.

It should be understood, therefore, that the foregoing disclosure relates only to preferred embodiments of the invention, and that it is intended to cover all changes and modifications of the examples of the invention chosen herein for the purpose of the disclosure which do not constitute departures from the spirit and scope of the invention set forth in the appended claims.

What is claimed is:

1. A vehicular suspension system comprising, in combination:
    a. a pneumatic spring,
        1. including a cylinder having an axis, a body of liquid in said cylinder, a body of gas in pressure transmitting relationship with said liquid, an apertured piston axially movable in said cylinder, and a piston rod attached to said piston and extending outward of said cylinder in sealing engagement with the cylinder;
    b. mounting means for securing said cylinder and said piston rod respectively to the sprung and unsprung masses of a vehicle;
    c. a fluid-operated source of gas under pressure spaced from said spring;
    d. elongated conduit means connecting said source to said body of gas for permitting flow of gas between said spring and said source and for thereby varying the spring characteristics of said spring;
    e. throttling means in said conduit means for impeding said flow;
    f. a source of an operating fluid; and
    g. control means interposed between said sources and operatively connected to said masses for connecting said sources and thereby increasing the pressure of said body of gas in response to relative movement of said masses in one direction, and for disconnecting said sources and thereby decreasing said pressure in response to relative movement of said masses in another direction opposite to said one direction.

2. A system as set forth in claim 1, wherein said source of gas includes a container and a movable wall sealingly separating two compartments in the interior of said container, said compartments respectively communicating with said conduit means and with said control means.

3. A system as set forth in claim 2, wherein said operating fluid is a liquid, said body of liquid being sealed from said operating liquid by said movable wall.

4. A system as set forth in claim 1, further comprising valve means for varying the flow resistance of said throttling means.

5. A vehicular suspension system comprising, in combination:
    a. two pneumatic springs;
    b. mounting means for securing respective portions of each of said springs to the sprung and unsprung masses of a vehicle;
    c. a fluid-operated source of gas under pressure spaced from each of said springs;
    d. two elongated conduits connecting said source to said springs respectively for permitting flow of gas between said springs and said source and for thereby varying the spring characteristics of said springs;
    e. throttling means in each of said conduits for impeding said flow and cooperating for making the resistance of said two conduits to flow of gas between said springs substantially greater than the resistance to flow of gas between either spring and said source of gas;
    f. a source of operating fluid; and
    g. control means interposed between said sources and operatively connected to said masses for connecting said sources and thereby increasing the pressure of said gas in response to relative movement of said masses in one direction, and for disconnecting said sources and thereby decreasing said pressure in response to relative movement of said masses in another direction opposite to said one direction.

6. A system as set forth in claim 5, further comprising valve means for simultaneously varying said resistance to flow of gas between either spring and said source of gas while leaving the resistance to flow of gas between said springs unchanged.

7. A system as set forth in claim 6, wherein said valve means include means for preventing flow of gas from said source thereof to either spring.

8. A system as set forth in claim 5, wherein said source of gas includes a container and a movable wall sealingly separating two compartments in the interior of said container, said compartments communicating with said valve means and with said control means through respective openings in said container.

9. A system as set forth in claim 8, further comprising abutment means for limiting movement of said wall in said interior in two terminal positions, said wall in one of said positions thereof sealing one of said openings.

10. A system as set forth in claim 9, wherein said wall in the other terminal position thereof seals the other opening.

* * * * *